G. S. KIRKLEY.
STOPPER.
APPLICATION FILED OCT. 13, 1915.
1,181,319.
Patented May 2, 1916.
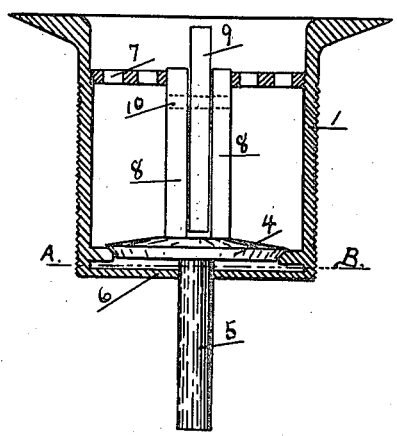
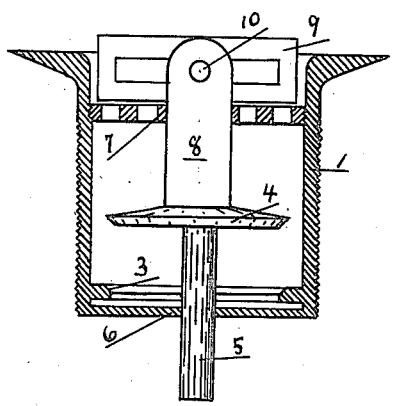
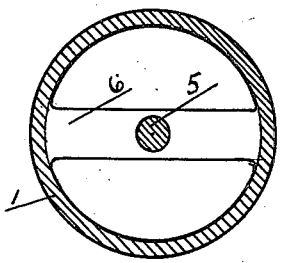
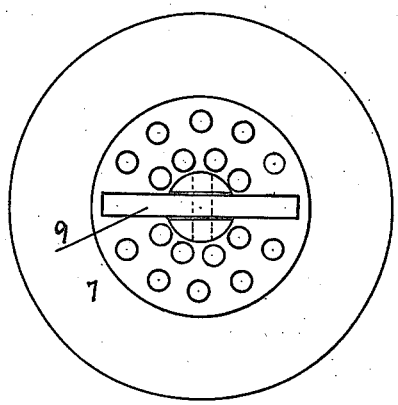
George S. Kirkley, Inventor
By William W. Varney, Attorney

UNITED STATES PATENT OFFICE.

GEORGE S. KIRKLEY, OF BALTIMORE, MARYLAND.

STOPPER.

1,181,319.

Specification of Letters Patent.

Patented May 2, 1916.

Application filed October 13, 1915. Serial No. 55,607.

*To all whom it may concern:*

Be it known that I, GEORGE S. KIRKLEY, a citizen of the United States, residing in Baltimore city, in the State of Maryland, have invented a certain new and useful Stopper, of which the following is a specification.

My invention relates to improvements in stoppers more especially to those used in domestic appliances such has sinks, basins, baths and so forth, and has for its object the providing of a stopper with improved means of opening and closing the same.

A further object of my invention is the providing of improved means of maintaining a stopper open.

With the foregoing and other objects in view my invention consists of the novel construction, combination and arrangement of parts as hereinafter specifically described and illustrated in the accompanying drawing, wherein is shown the preferred embodiment of my invention, but it is to be understood that changes, variations and modifications can be resorted to which come within the scope of the claims hereunto appended.

In the drawing of the herein described embodiment of my invention, Figure 1 shows a vertical view partly in section of my improved stopper closed; Fig. 2 shows a view in elevation partly in section of my improved stopper open it being a view taken at right angles to that shown in Fig. 1; Fig. 3 is a plan view of the stopper shown in Fig. 2; and Fig. 4 is a sectional view taken through A B of Fig. 1.

Similar numerals refer to similar parts throughout the several views.

1, is the stopper casing which is secured to the sink bowl or tub in the ordinary way, such as nuts and washers and union fittings not shown or in any other suitable way.

2 is a threaded portion of casing 1 to secure such fittings.

3 is a valve seat secured to or made integral with casing 1.

4 is a valve operating to seat on valve seat 3.

5 is a valve or guiding stem secured to valve 4 and operates through guide member 6, which guide member is secured to or made integral with casing 1.

7 is a strainer removably secured within casing 1 by being threaded therein as shown in the drawing or otherwise conveniently maintained in position.

8 is the head or handle member secured to valve 4 and consists of jaws to which link handle 9 may be operatively connected.

10 is a pin connecting head 8 and link handle 9.

The operation of my invention is as follows: The casing 1 having been secured to the receptacle to be drained and being in a closed position as shown in Fig. 1 the valve is opened by grasping link handle 9 above or outside of strainer 7 and lifting the valve until the inner or lower end of link handle 9 is out or high enough to clear strainer 7 when the link handle is then rotated about pin 10 and dropped in place against strainer 7 as shown in Fig. 2 thus by means of said link handle locking the valve in open position as shown in Fig. 2. Link handle 9 when in this position may be rotated about the axis of head 8 thereby sweeping the strainer cleaning the same. The valve is locked open as soon as link handle 9 is thrown out of alinement with the movement of the valve whereby it brings up against any obstruction or member such as strainer 7.

When the valve is in closed position and owing to the fact that head 8 is circular and that link handle 9 is contained within head 8 and extends above the strainer and said head it is used as a handle for rotating the valve on its seat for grinding or cleaning the same when desired.

Having thus described my invention what I claim and desire to secure by Letters Patent is—

1. In a stopper, a casing, a valve seat secured to said casing, a guide below said seat, a valve operating to seat in said valve seat and guided by a stem operating in said guide, a strainer above said valve, and means for operating said valve without said strainer consisting of a head containing an elongated slotted link therein.

2. A stopper embracing, a casing, a valve seat, a valve seating on said valve seat and provided with a head, a strainer, a slotted link operating on said head and above said strainer when the valve is open sweeping the same when the head is rotated cleaning the strainer.

3. A stopper embracing, a casing, a valve seat, a valve seating on said valve seat and provided with a head, a strainer, a link within said head and extending above said strainer when the valve is on its seat providing a means for grinding the valve when seated.

GEORGE S. KIRKLEY.

Witnesses:
  WALTER R. HEATH,
  WILLIAM W. VARNEY.